(12) United States Patent
Dykeman et al.

(10) Patent No.: US 7,573,885 B1
(45) Date of Patent: Aug. 11, 2009

(54) ALTERNATIVE ROUTING IN PNNI HIERARCHICAL NETWORKS

(75) Inventors: Harold Douglas Dykeman, Richterswil (CH); Paolo Michele Scotton, Rueschlikon (CH); Claude Basso, Raleigh, NC (US); Philippe Damon, Carrboro, NC (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 09/633,767

(22) Filed: Aug. 7, 2000

(51) Int. Cl.
*H04L 12/28* (2006.01)

(52) U.S. Cl. .................... 370/395.1; 370/401; 370/216; 370/255

(58) Field of Classification Search ............ 370/395.32, 370/395.3, 395.31, 389, 396, 395.1, 400, 370/216, 218, 221, 225, 228
See application file for complete search history.

(56) References Cited

U.S. PATENT DOCUMENTS 5,831,975 A * 11/1998 Chen et al. ................. 370/256
5,831,982 A * 11/1998 Hummel ..................... 370/396
6,304,549 B1 * 10/2001 Srinivasan et al. .......... 370/230
6,473,408 B1 * 10/2002 Rochberger et al. ......... 370/255
6,532,237 B1 * 3/2003 Or et al. ..................... 370/396

* cited by examiner

*Primary Examiner*—Duc C Ho
(74) *Attorney, Agent, or Firm*—Vazken Alexanian

(57) ABSTRACT

Methods and apparatus are provided for alternative routing of a connection between a source node and a destination node in a PNNI hierarchical network. The alternative routing method comprises responding to a failed connection between said nodes due to a sole-access element of the network structure as seen by the source node, where a said sole-access element is an element which provides sole access to the destination node in said network structure, by: selecting at least one non-sole-access element of the route used by the failed connection in said network structure; identifying an alternative route for the connection in said network structure which does not utilize the at least one selected element; and using the alternative route for establishment of the connection between said nodes.

12 Claims, 2 Drawing Sheets ative routing may not be attempted. To illustrate this, consider again the scenario described above in which the links from C1 to C3 and from C1 to C2 do not have sufficient bandwidth to support the call. The initial DTL specified by A1 is:

ALTERNATIVE ROUTING IN PNNI HIERARCHICAL NETWORKS

FIELD OF THE INVENTION

This invention relates to alternative routing of connections between source and destination nodes in PNNI hierarchical networks.

BACKGROUND

PNNI (Private Network-to-Network Interface) is a standards-based signaling and routing protocol which was approved by the ATM (Asynchronous Transfer Mode) Forum in 1996 for use in ATM systems. The PNNI protocol provides, inter alia, a system for creation and distribution of topology information which determines how individual network nodes "see" the network and thus how nodes communicate. A key feature of the protocol is the ability to cluster groups of switches into "peer groups". The details of each peer group are abstracted into a single logical node which is all that can be seen outside of that peer group. This system is applied recursively so that PNNI can hierarchically aggregate network topology information. The hierarchical system is illustrated schematically in FIG. 1 of the accompanying drawings which shows a simple, three-level hierarchical network. At the lowest level of the hierarchy in this example, the nodes labeled A1 to D2 represent real switches. The switches A1, A2 and A3 are clustered to form a peer group which is represented by a logical node A in the next level up of the hierarchy. The switches B1 and B2 form a peer group which is represented by logical node B in the next level. Similarly, switches C1 to C3 and switches D1 and D2 are represented by nodes C and D respectively in the next level. Further, nodes A and B are clustered and represented by logical node X in the upper level of the hierarchy. Nodes C and D are also clustered and are represented by logical node Y in the upper level.

The topology information available to the switches is such that each switch sees the details of its own peer group plus the details of any peer group that represents it at a higher level of the PNNI hierarchy. Thus, the network structure as seen by switch A1 in the above example is as illustrated in FIG. 2 of the accompanying drawings. Switch A1 sees two links to logical node B and one link from B to logical node Y. Node B represents all of the switches in that group, namely B1 and B2, and node Y represents all of the switches in groups C and D, namely C1, C2, C3, D1 and D2. As demonstrated by this Figure, the hierarchical aggregation of topology information leads to loss of information. For example, the details of switches C1 to D2 are hidden to switch A1 which sees only the logical node Y representing these switches. This loss of information can lead to problems with the routing of connections for communication between nodes as will be demonstrated below.

ATM is a source routing technology. When a connection is established between nodes, the route that the connection takes through the network is specified by the first switch. This switch specifies the route as a series of paths, one for each level of the PNNI hierarchy that is traversed between the source and destination. The series of paths defining a route is known as a DTL (Designated Transit List). For example, referring again to FIGS. 1 and 2, suppose that a call is received at switch A1 addressed to an end system attached to switch D2. Due to the hierarchy, switch A1 does not see D2 but rather the node Y which represents D2 at a higher level. Thus, A1 may compute the following DTL for establishment of the connection:

X, Y

A, B

A1, A2

At the lowest level of the hierarchy the call goes from A1 to A2. At the second level of the hierarchy the call goes from A to B. At the top level of the hierarchy the call goes from X to the destination at Y. In the real network, the connection setup will start at A1 and be forwarded to A2 as specified. Switch A2 will forward the setup to switch B1 since it knows that its neighbor is in group B which is specified in the computed path. Switch B1 will forward the setup to switch C1 since it knows that its neighbor is in group Y which is specified in the computed path. C1 determines from the call address that the call should be forwarded to node D, and thus from C1 the call may be transferred to C2, and from there via D1 to the destination node D2.

To increase the probability that a connection can be established successfully, the ATM Forum defines a crankback mechanism. If a call setup fails, the call is returned to node(s) that created the path to attempt to choose an alternative path ("alternative routing"). To achieve this, the call is returned with a crankback element giving an indication as to which element of the network failed to forward the call. To illustrate the crankback mechanism, consider the situation where, in establishing the connection in the above example, the links from C1 to C3 and from C1 to C2 do not have sufficient bandwidth to support the call. In this situation the call cannot be established successfully since C1 has no way to forward it to the destination D2. The crankback mechanism is therefore used to return the call for possible alternative routing. The call is returned by C1 to B1. Since the lowest common level of hierarchy between these two nodes is that containing nodes X and Y, the call is returned with cause code "Node Y is blocked." C1 cannot tell B1 about the internal links and switches in its peer group since B1 cannot see them. Since node B did not specify the path X, Y it will not attempt to reroute the call. The call is next returned to switch A2, but since A2 did not specify the path, it is immediately returned to switch A1. Switch A1 is thus informed that the call setup failed because node Y is blocked. However, in the network structure as seen by A1, node Y constitutes an element which provides the only way to access the destination node D1 to which the call must be sent. Such an element, which provides sole access to a destination node, will be referred to herein as a "sole-access element". According to the rerouting scheme which is specified in the PNNI protocol, switch A1 will not try to find an alternative route for the call since a sole-access element, here node Y, is blocked. Thus, a successful connection cannot be established and the call setup fails.

The weakness of the above system can be seen from consideration of FIG. 1 which shows that there is a route over which the call could be established successfully, namely: A1, A3, B2, C3, C2, D1 and D2. Thus, if switch A1 had originally specified the route:

X, Y

A, B

A1, A3 then the call setup would have been successful. However, even with the crankback mechanism, the alternative routing scheme fails because a significant part of the network topology is hidden from the switch attempting to reroute the connection.

SUMMARY

According to one aspect of the present invention there is provided a method for alternative routing of a connection between a source node and a destination node in a PNNI hierarchical network, the method comprising responding to a failed connection between said nodes due to a sole-access element of the network structure as seen by the source node, where a said sole-access element is an element which provides sole access to the destination node in said network structure, by:

selecting at least one non-sole-access element of the route used by the failed connection in said network structure;

identifying an alternative route for the connection in said network structure which does not utilize the at least one selected element; and using the alternative route for establishment of the connection between said nodes.

DESCRIPTION OF THE FIGURES

Preferred embodiments of the invention are described, by way of example, with reference to the accompanying drawings in which.

DESCRIPTION

Figure 1:
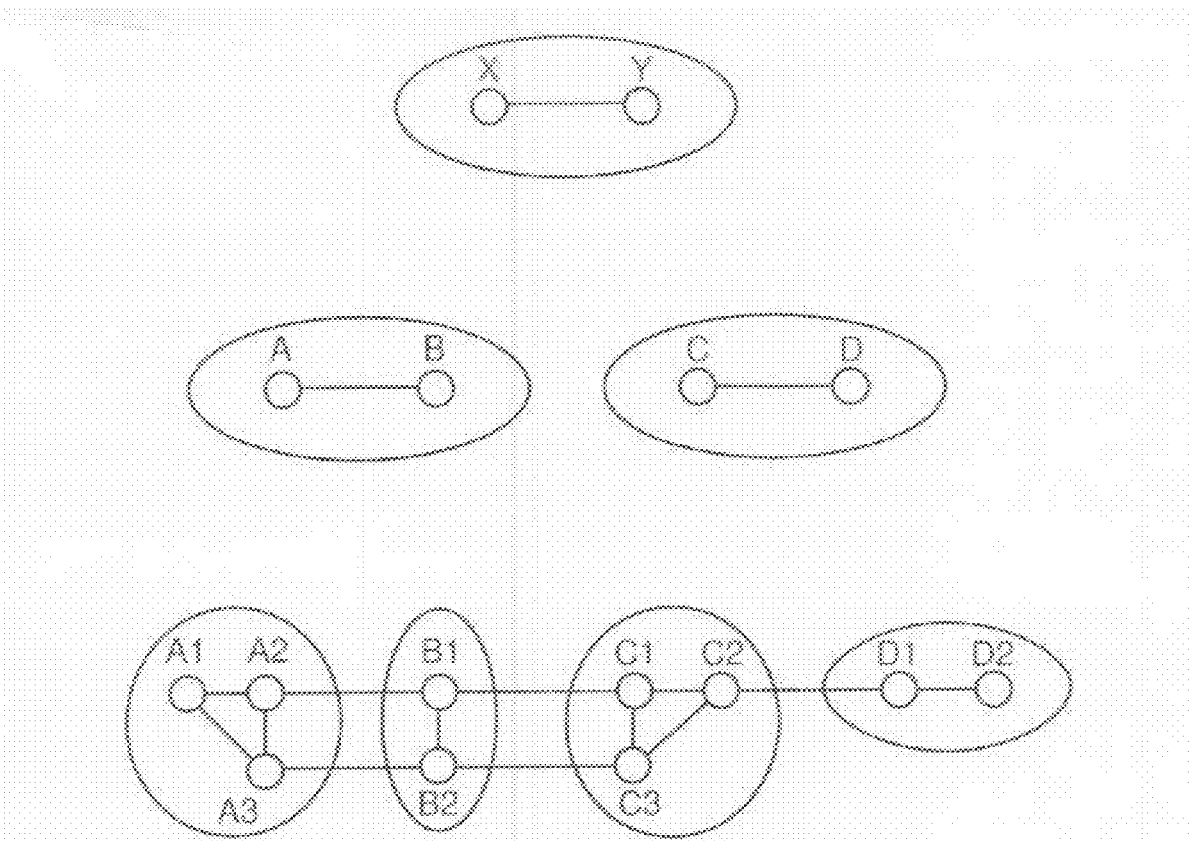
FIG. 1 is a schematic representation of an example of a PNNI hierarchical network.

The present invention is predicated on the realization that a failed connection due to a sole-access element of the network structure seen by the source node can occur due to selection of another element in the route. Thus, by altering the selection of one or more non-sole-access elements (ie. elements which are not sole-access elements), a route by which the connection can be established correctly can often be found. For example, in the scenario discussed above where the connection failed on the basis that the sole-access node Y was blocked, a different result could have been achieved by making a different selection of the non-sole access elements earlier in the route. Evidently if there are no non-sole access elements in a particular failed route then there will be no alternative route to try. However, where there is at least one non-sole access element there will be at least one alternative route, and embodiments of the present invention can identify this and reroute the connection accordingly. Thus, embodiments of the present invention allow successful rerouting of connections where the previous rerouting scheme would have failed, improving the overall performance and robustness of networks in which the invention is applied.

In preferred embodiments of the invention, the method includes the step of checking whether the alternative route satisfies a set of predefined connection constraints, wherein the alternative route is used for establishment of the connection only if said constraints are satisfied. The set of connection constraints may include one or more constraints and these may vary for different connections. In particular, PNNI supports the use of Quality of Service (QoS) parameters whereby incoming calls can specify certain constraints which the network must satisfy when establishing the connection. Typical constraints relate, for example, to the bandwidth required by a call and the acceptable delay introduced by the connection. The PNNI protocol allows a source node to determine if these constraints can be met by a particular route, and if not the route will be rejected.

While methods can be envisaged in which the selected element or elements of the failed route are nodes of the network structure, it is preferred that the selected elements, ie. the elements which are avoided when determining the alternative route, are links of the network structure. Various systems can be used for selecting the particular elements to be avoided when determining an alternative route, and examples of preferred systems will be described in detail below.

In methods embodying the invention, if a successful connection is not established with a first-identified alternative route (eg. because the route does not meet any specified connection constraints or because the connection fails again when the alternative route is used), then the method may be applied again making a different selection of non-sole-access elements if available, to identify a different alternative route. Thus, methods embodying the invention may be iterative. The number of attempts which are made to find a successful route may of course be limited to avoid excessive use of resources. For example, while multiple attempts may be made to identify a "valid route" (ie. a route which meets any specified connection constraints), the number of attempts to reroute a connection using different valid routes may be limited. In particular, some embodiments may make only one attempt at rerouting a connection in order to preserve network resources.

It is to be understood that, in general, where features are described herein with reference to a method embodying the invention, corresponding features may be provided in accordance with apparatus embodying the invention, and vice versa. In particular, a further aspect of the present invention provides apparatus for alternative routing of a connection between a source node and a destination node in a PNNI hierarchical network, the apparatus comprising:

memory for storing topology data, defining the network structure as seen by the source node, and route data indicative of a route in said network structure used for establishment of a connection between the source node and a destination node;

control logic configured to respond to a failed connection between said nodes due to a sole-access element of the network structure as seen by the source node, where a said sole-access element is an element which provides sole access to the destination node in said network structure, by:

selecting at least one non-sole-access element of the route used by the failed connection in accordance with said route data;

identifying from said topology data an alternative route for the connection which does not utilize the at least one selected element; and outputting the alternative route for establishment of the connection between said nodes.

The apparatus may be embodied in a source node such as a switch, router, bridge, brouter or other network device. Alternatively, the apparatus may be embodied in a dedicated route server associated with a peer group including the source node. The invention also extends to a PNNI hierarchical network comprising such apparatus.

Preferred embodiments of the invention will now be described, by way of example, with reference to the accompanying drawings.

In the following, a preferred method embodying the invention will initially be described in detail, and operation of the preferred method will be described in relation to the networks of FIGS. 1 and 3. For the purpose of this example, it will be assumed that each switch in the exemplary networks is capable of implementing the rerouting method, so that each switch in its own right constitutes apparatus embodying the invention. To enable a switch to implement the alternative routing method, control logic for implementing the various steps to be described is provided in the switch. The control logic may be implemented in hardware or software or a combination thereof, and suitable implementations will be apparent to those skilled in the art from the following description.

The rerouting method performed by a switch can be summarized conveniently by the following pseudo-code, where it is assumed initially that a failed connection between that switch and a destination node has just occurred.

1. Block all the links used by the failed connection that are outside our peer group;

2. if (any link is a sole-access link)
   then do
      unblock the link giving access to it;
   done 3. Store the list of blocked links in BL;
   Sort BL by decreasing distance from source node (links closest to the destination at the top);

4. Compute the route;
   if (route is valid)
   then do
      give the route to signalling;
      End;
   done 5. Unblock all the links;

6. for all the elements in BL do
      Unblock previous element if there was one;
      Block the current element;
      Compute the route;
      if (route is valid)
      then do
         Give the route to signalling;
         End;
      done
   done 7. Give 'No route to destination' to signalling.

In the above algorithm, a number of the steps refer to blocking or unblocking of certain links. In reality, the links are not of course physically blocked or unblocked, but rather certain links are selected or deselected, and as a result of this selection/deselection process certain links will be considered to be blocked for the purpose of identifying an alternative route. This will be apparent from the following description in which the way that the algorithm is implemented by a source switch is considered in more detail.

In step 1, the switch control logic initially selects ("blocks") all links of the route used by the failed connection which are outside its own peer group. The links used by the failed connection are defined by route data which has previously been stored in a memory of the switch and can be accessed by the control logic when required for the alternative routing scheme. In step 2, the control logic deselects ("unblocks") any sole-access links since these must be used by any route to the destination node. The control logic can identify sole-access links by reference to the topology data which has been set up previously in accordance with the PNNI protocol and which is stored in the switch memory. This topology data defines the network structure seen by the switch as described earlier. In step 3, the control logic stores the remaining selected links, (the "blocked links"), as a blocked-link list BL in the switch memory. The control logic then sorts the links in BL in order of decreasing distance from the source node such that the link which is closest to the destination node is at the top of the list.

After this initial selection process, in step 4 the control logic analyzes the topology data with reference to the list BL to determine if there is an alternative route to the destination which does not utilize any of the "blocked" links in BL. If an alternative route is identified, the control logic then checks, by means of the known processing operations specified by PNNI which need not be detailed here, whether the route satisfies any connection constraints, such as QoS bandwidth or delay requirements etc., which have been specified by the incoming call. Again, these constraints will be stored in the switch memory for access by the control logic. If the constraints are met then the alternative route is deemed to be valid. If the route is valid, the control logic outputs the route to the signaling circuitry of the switch (not described but of known form) for establishing the connection, and the process is finished. If, on the other hand an alternative route identified in this step does not satisfy the connection constraints and is therefore determined to be invalid, the process proceeds to step 5 wherein all the links are "unblocked". Again, this "unblocking" of the links in step 5 is only notional in that the "blocked" links in BL are simply treated by the control logic as deselected, or "unblocked", for the start of step 6 to which the process now proceeds.

Step 6 begins with an iterative process in which the control logic selects, or "blocks", each link in BL in turn, starting at the top of the list. When a link is selected, the control logic then determines as described above whether there is a valid alternative route which does not utilize the selected link. If so the route is output to the signaling circuitry for rerouting the connection and the process terminates. If there is no valid route for the currently-selected link then the process proceeds to the next pass of the iteration in which the currently-selected link is deselected, the next link in the list BL is selected, and a valid alternative route is sought which does not utilize the newly-selected link. If, after all links in BL have been selected in turn, no valid route has been found, then the process proceeds to step 7 wherein the control logic outputs a message indicating that no valid route to the destination node is available. This message is communicated to the signaling circuitry for transfer to the device which originated the call.

Consideration of the above rerouting algorithm shows that it can be divided into two parts. The first part consists of steps 1 to 4. This part aims to identify the most disjoint (most different) route to that used by the failed connection. This is done by selecting all links in the set of non-sole-access links in the route used by the failed connection which are outside the peer group of the source switch, and identifying an alternative route which does not utilize any of these links. If this fails then the second part, consisting of steps 5 to 7, is implemented. This part involves selecting the non-sole access links of the aforementioned set one at a time, starting with the link closest to the destination node, and checking for an alternative route which does not utilize the selected link.

This particular algorithm makes only one attempt at rerouting a failed connection. Thus, when a valid alternative route has been used for establishing a connection, if the connection fails again then no attempt is made to find another alternative route. The first part of the method looks for the most disjoint route since this generally has the best chance of success if used for rerouting the connection. In the second part of the method, selecting links in order of increasing distance from the destination node makes it likely that a more disjoint path, which generally provides a better chance of a successful connection than a less disjoint path, will be found first. Thus, while only one rerouting attempt is made to keep use of network resources to a minimum, the method ensures that there is a good chance that this one attempt will be successful.

To demonstrate operation of the rerouting method, consider first the situation previously described with reference to FIG. 1 where a failed connection between source node A1 and destination node D2 has just occurred due to insufficient bandwidth in the links from C1 to C2 and C1 to C3 with the following route:

X, Y
A, B
A1, A2

Figure 2:
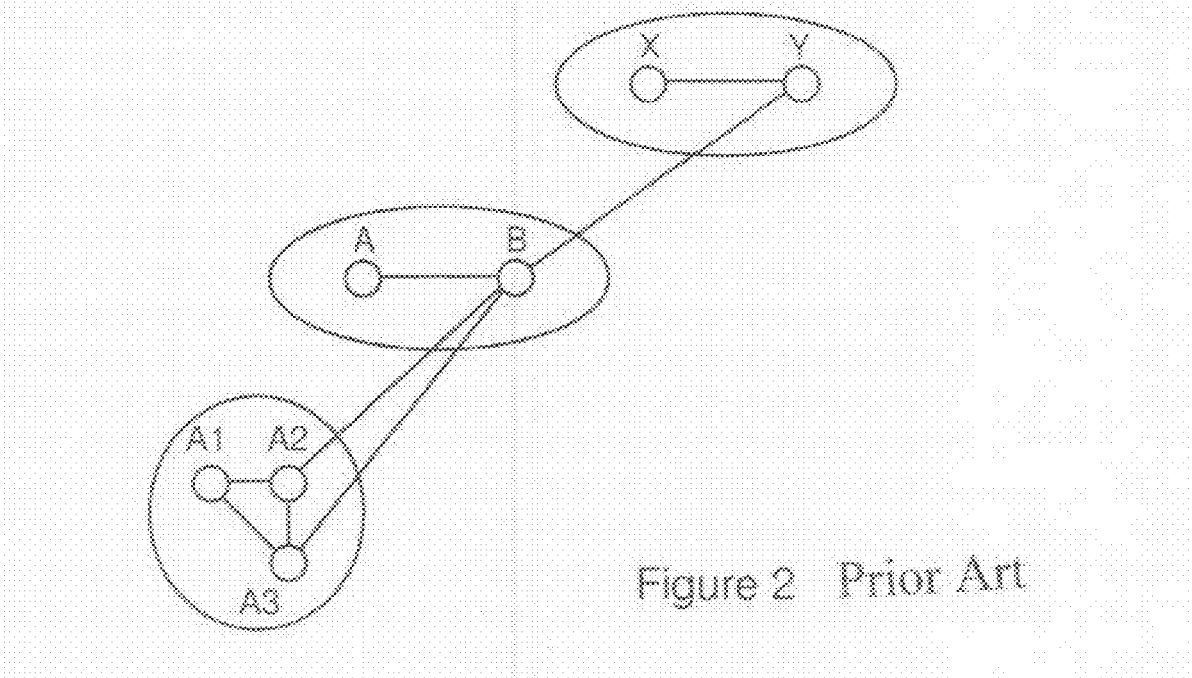
FIG. 2 illustrates the network structure as seen by the switch A1 in FIG. 1.

In this case, switch A1 is a switch embodying the invention which can implement the preferred method as described above. Thus, when the call is returned to A1 with the cause code "Node Y is blocked", the rerouting algorithm is implemented even though node Y is a sole-access element. In accordance with step 1 of the method, A1 first "blocks" all links used by the failed connection outside of its peer group, namely A2-B, and B-Y. It is apparent from FIG. 2, however, that the link B-Y is a sole-access link so this link is "unblocked" in step 2. The list BL in step 3 therefore contains only A2-B. The alternative route identified in step 4 is therefore:

X, Y
A, B
A1, A3

Assuming this route satisfies any specified connection constraints and is therefore deemed valid, the route will be output for establishment of the connection. In the real network, the route will cause the connection to go through the following sequence of switches: A1, A3, B2, C3, C2, D1 and D2, and the connection will be established successfully.

Figure 3:
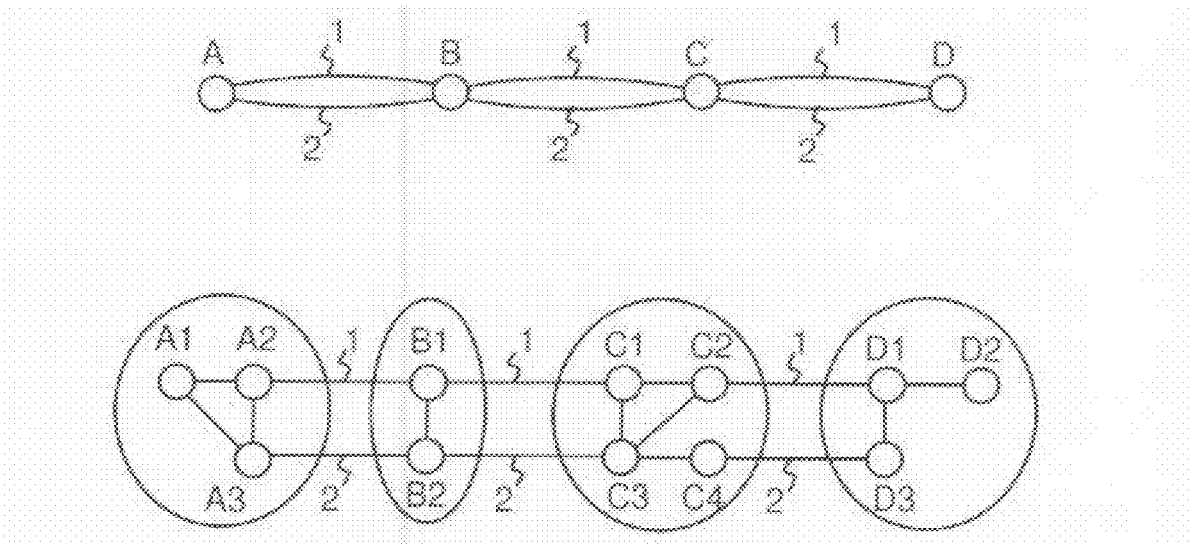
FIG. 3 is a schematic representation of another example of a PNNI hierarchical network.

Consider next the two-level hierarchical network of FIG. 3. The lowest level of the hierarchy in this network is similar to that of FIG. 1 except that there are additional switches C4 and D3 interconnected as shown. The four groups of switches A1 to A3, B1 and B2, C1 to C4, and D1 to D3 are clustered to form peer groups which are represented by logical nodes A, B, C and D in the upper level of the hierarchy as indicated. In this example, however, the links interconnecting peer groups are not aggregated in the hierarchy, so that, in the upper level, successive nodes A, B, C and D are interconnected by two links. In each pair of links interconnecting two nodes, the upper link in each pair is labeled 1 in the figure indicating that this link originates at a first port (port 1) of the preceding node. The lower link of each pair is labeled 2 in the figure indicating that this link originates at a second port (port 2) of the preceding node. The network structure as seen by node A1 in this case is as shown in FIG. 4.

Figure 4:
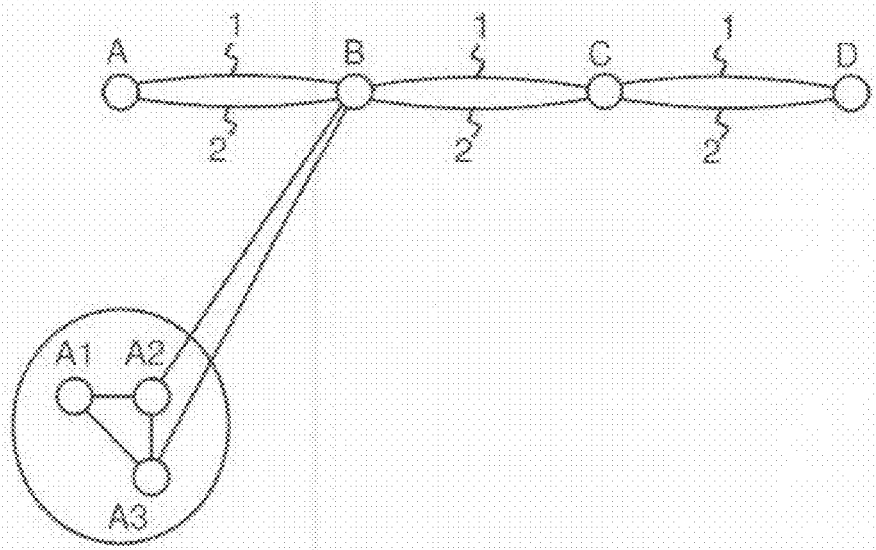
FIG. 4 illustrates the network structure as seen by the switch A1 in FIG. 3.

Suppose that, as before, switch A1 has received a call addressed to an end system attached to D2 and computes the following initial route for the connection:

A1, B1, C1, D
A1, A2 where, in the path A1, B1, C1, D, the notation "A1" signifies node A, port 1, "B1" signifies node B, port 1, and so on, so that the upper links 1 in FIG. 4 should be used. In the real network the call setup is forwarded by A1 to A2 as specified in the route. Switch A2 then forwards the setup directly to B1 via the upper link 1 as specified in the route. Similarly, B1 forwards the setup directly to C1 via the upper link 1 as specified in the route. Suppose that, as before, the links from C1 to C2 and from C1 to C3 do not have sufficient bandwidth to support the call so that the call cannot be completed. The crankback mechanism is then used to return the call to the source switch A1 with the cause code "Node C is blocked". Node C is a sole-access element of the network structure as seen by A1 since any connection to the destination node for the call must utilize node C. Thus, with the existing rerouting scheme specified by PNNI, A1 would not attempt to reroute the call since a sole-access element is blocked. Here, however, the switches A1 to D2 are configured for implementing the rerouting algorithm described in detail above. Thus, when the call is returned to A1, A1 will initially block the links A1-B, B1-C and C1-D used by the failed connection outside its peer group (step 1). None of these links are sole-access links (step 2), so that, at the end of step 3, the blocked link list BL will contain all these links in the order C1-D, B1-C, A1-B. In step 4, A1 computes the following route which uses none of the "blocked" links in B:

A2, B2, C2, D
A1, A3 where, in the path A2, B2, C2, D, the notation "A2" signifies node A, port 2, "B2" signifies node B, port 2, and so on, so that the lower links 2 in FIG. 4 should be used. For the sake of example, assume now that this route does not meet the specified delay constraints for the call, so that the route is not valid. All the links in BL are then "unblocked" (step 5) and the process proceeds to step 6. In the first stage of step 6, the first link in the list BL, ie. C1-D is initially blocked and the control logic of A1 computes an alternative route which does not utilize this link. Since there is more than one possible route here, in this embodiment the control logic selects a particular route at random, though of course other selection systems could be used if desired. Thus, for example, A1 may identify the following route:

A1, B2, C2, D
A1, A2

Again for the sake of example, suppose that this route is deemed invalid. Switch A1 will then continue the search for a valid route by selecting another route which avoids the "blocked" link C1-D, for example using the upper-level path A2, B1, C2, D. Suppose further that this route, and each of the other possible routes which do not use the link C1-D, is also found to be invalid. Switch A1 then continues with step 6 by unblocking C1-D and blocking the next link in BL, namely B1-C. A1 now computes a route which does not utilize B1-C. Again, since there is more than one route to choose from here, a particular route will be selected at random. This may be a route already identified as an invalid route, eg. the route using the upper level path A1, B2, C2, D, so the control logic will select another route, eg:

A2, B2, C1, D
A1, A3.

Assuming this route satisfies the connection constraints, the route will be output to signaling. In the real network, the connection will pass through the following sequence of switches: A1, A3, B2, C3, C2, D1 and D2, and the connection will be established successfully.

When considering the application of the preferred algorithm in the networks of FIGS. 1 and 3, the description has focused on examples of failed connections where the failure is due to a sole-access element of the network structure as seen by the source node since these are the situations where the existing rerouting scheme would inevitably fail to find an alternative route. It will be appreciated however, that in practice the algorithm will be applied in response to any failed connection whether or not due to a sole-access element, and provides a highly efficient rerouting system in all circumstances.

It will also be appreciated that, while a particularly preferred embodiment has been described in detail above, many changes and modifications can be made to the embodiment described without departing from the scope of the invention. For example, in some situations it may be acceptable, or even preferable, for step 3 of the algorithm to sort the links in BL by increasing distance from the source node, ie links closest to the source node at the top. In some embodiments, therefore, the control logic may be configured to implement the algorithm with this modification in all cases, or the control logic may be configured to select which of the two orders to adopt in a particular situation. In addition, in some embodiments step 6 of the above algorithm may be modified by removal of the statement "unblock previous element if there was one". The effect of this would be that, when performing step 6, the control logic would successively block more links in each pass of the iterative process. This would reduce processing time by restricting the number of routes tried by the control logic, while still providing a good chance of successfully rerouting a connection.

As a further example, some embodiments may utilize only one part of the algorithm described above, ie. steps 1 to 4 or steps 5 and 6. While the two-part algorithm is clearly more likely to result in successful rerouting, use of either part on its own will still allow successful rerouting to be achieved in many cases where the prior scheme would have failed, and these simpler algorithms may be appropriate in some circumstances, eg. where it is desired to simplify the processing as far as possible.

Further, while the above method makes only one attempt at rerouting a connection, in some embodiments it may be desirable to make more than one attempt, or even to try all possible valid routes before returning a "No route to destination" code. In these cases, if a valid alternative route is used for establishing a connection and the connection fails again, then the failed route may be stored in the control logic as an invalid route, and the method repeated to identify a new alternative route.

As a further example, in the networks as described above, each switch incorporates control logic for implementing the rerouting method when a failed call is returned to the switch. In other embodiments, the rerouting method may be implemented by a dedicated node, such as a route server, which manages rerouting of calls for any source node within a particular peer group. Thus, one such route server may be provided for each peer group, the route server being connected in the peer group and sharing the same view of the network topology as the other nodes in the group. When a failed call is returned to a source node in a given peer group, the source node simply sends the details of the failed route to the route server together with any connection constraints and the cause code for the connection failure. The route server then implements the rerouting method as described above, returning the alternative route to the source node for forwarding to signaling. The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context is meant to include any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A computer-implemented method for alternative routing of a connection between a source node and a destination node in a PNNI (Private Network-to-Network Interface) hierarchical network, the method comprising responding to a failed connection between said nodes due to a sole-access element of a network structure as seen by the source node, where a said sole-access element is an element which provides sole access to the destination node in said network structure, by:

examining possible routes closest to the destination node;

using switch control logic to select at least one non-sole-access element of a particular route used by the failed connection in said network structure;

using control logic for identifying an alternative route for the failed connection in said network structure which utilizes said at least one non-sole-access element;

using the control logic for using the alternative route for establishment of the failed connection between said source and destination nodes;

checking whether said alternative route satisfies a set of predefined connection constraints, wherein said alternative route is used for establishment of the connection only if said constraints are satisfied, wherein said at least one non-sole-access element is a link of said network structure, wherein the step of selecting comprises selecting from the set of all non-sole-access elements used by said failed connection which are outside the PNNI peer group of the source node the link which is closest to a predetermined one of the source and destination nodes, and further comprising:

(a) if a successful connection is not established using the alternative route, selecting from said set of non-sole-access links the next closest link to the predetermined node, identifying a new alternative route for said connection which does not utilize said next closest link, and using the new alternative route for establishment of the connection between said nodes; and (b) repeating step (a) for the new alternative route until all links in said set have been selected.

2. A method according to claim 1 including checking whether an identified new alternative route satisfies a set of predefined connection constraints, wherein the identified new alternative route is used for establishment of the connection only if said constraints are satisfied.

3. A method according to claim 1 wherein said new alternative route does not utilize any link of said set between said predetermined node and said next closest link.

4. A computer-implemented method for alternative routing of a connection between a source node and a destination node in a PNNI hierarchical network, the method comprising:

responding to a failed connection in the network between said nodes due to a sole-access element of a network structure as seen by the source node, where a said sole-access element is an element which provides sole access to the destination node in said network structure, by:

examining possible routes closest to the destination node;

selecting at least one non-sole-access element of a particular route used by the failed connection in said network structure;

identifying an alternative route for the failed connection in said network structure which utilizes said at least one non-sole-access element; and using the alternative route for establishment of the failed connection between said source and destination nodes;

checking whether said alternative route satisfies a set of predefined connection constraints, wherein said alternative route is used for establishment of the connection only if said constraints are satisfied;

wherein said at least one non-sole-access element is a link of said network structure, wherein the step of selecting comprises selecting all non-sole-access links of the route used by said failed connection which are outside the PNNI peer group of the source node, and wherein, if a successful connection is not established using said alternative route, the method includes:

(a) selecting from the set of all non-sole-access elements used by said failed connection which are outside the PNNI peer group of the source node the link which is closest to a predetermined one of the source and destination nodes, identifying a new alternative route for the connection which does not utilize said closest link, and using the new alternative route for establishment of the connection between said nodes; and (b) if a successful connection is not established using the new alternative route, selecting from said set of non-sole-access links the next closest link to the predetermined node, identifying a new alternative route for said connection which does not utilize said next closest link and using the new alternative route so identified for establishment of the connection between said nodes; and (c) repeating step (b) for the new alternative route so identified until all links in said set have been selected.

5. A method according to claim 4 including checking whether an identified new alternative route satisfies a set of predefined connection constraints, wherein the identified new alternative route is used for establishment of the connection only if said constraints are satisfied.

6. A method according to claim 4 wherein the new alternative route identified in step (b) does not utilize any link of said set between said predetermined node and said next closest link.

7. Apparatus for alternative routing of a connection between a source node and a destination node in a PNNI hierarchical network, the apparatus comprising:

memory for storing topology data, defining a network structure as seen by the source node, and route data indicative of a particular route in said network structure used for establishment of a connection between the source node and a destination node;

control logic configured to respond to a failed connection between said nodes due to a sole-access element of the network structure as seen by the source node, where a said sole-access element is an element which provides sole access to the destination node in said network structure, by:

examining possible routes closest to the destination node;

selecting at least one non-sole-access element of the route used by the failed connection in accordance with said route data;

identifying from said topology data an alternative route for the failed connection which utilizes said at least one non-sole-access element; and outputting the alternative route for establishment of the failed connection between said source and destination nodes, wherein the control logic is configured to check whether the alternative route satisfies a set of predefined connection constraints, and to output the alternative route for establishment of the connection only if said constraints are satisfied, wherein said at least one sole-access element is a link of said network structure, wherein the control logic is configured to select from the set of all non-sole-access elements used by the failed connection which are outside the PNNI peer group of the source node the link which is closest to a predetermined one of the source and destination nodes when performing said selecting step, wherein the control logic is configured such that:

(a) if a successful connection is not established using the alternative route, the control logic selects from said set of non-sole-access links the next closest link to the predetermined node, identifies a new alternative route for said connection which does not utilize said next closest link, and outputs the new alternative route for establishment of the connection between said nodes; and (b) the control logic repeats step (a) for the new alternative route until all links in said set have been selected.

8. Apparatus according to claim 7 wherein the control logic is configured to check whether an identified new alternative route satisfies a set of predefined connection constraints, and to output the identified new alternative route for establishment of the connection only if said constraints are satisfied.

9. Apparatus according to claim 7 wherein the new alternative route does not utilize any link of said set between said predetermined node and said next closest link.

10. Apparatus for alternative routing of a connection between a source node and a destination node in a PNNI hierarchical network, the apparatus comprising:

memory for storing topology data, defining a network structure as seen by the source node, and route data indicative of a particular route in said network structure used for establishment of a connection between the source node and a destination node;

control logic configured to respond to a failed connection between said nodes due to a sole-access element of the network structure as seen by the source node, where a said sole-access element is an element which provides sole access to the destination node in said network structure, by:

examining possible routes closest to the destination node;

selecting at least one non-sole-access element of the route used by the failed connection in accordance with said route data;

identifying from said topology data an alternative route for the failed connection which utilizes said at least one non-sole-access element; and outputting the alternative route for establishment of the failed connection between said source and destination nodes, wherein the control logic is configured to check whether the alternative route satisfies a set of predefined connection constraints, and to output the alternative route for establishment of the connection only if said constraints are satisfied, wherein said at least one sole-access element is a link of said network structure, wherein the control logic is configured to select all non-sole-access links of the route used by said failed connection which are outside the PNNI peer group of the source node when performing said selecting step, wherein the control logic is configured such that, if a successful connection is not established using said alternative route:

(a) the control logic selects from the set of all non-sole-access elements used by said failed connection which are outside the PNNI peer group of the source node the link which is closest to a predetermined one of the source and destination nodes, identifies a new alternative route for the connection which does not utilize said closest link, and outputs the new alternative route for establishment of the connection between said nodes; and (b) if a successful connection is not established using the new alternative route, the control logic selects from said set of non-sole-access links the next closest link to the predetermined node, identifies a new alternative route for said connection which does not utilize said next closest link, and outputs the new alternative route so identified for establishment of the connection between said nodes; and (c) the control logic repeats step (b) for the new alternative route so identified until all links in said set have been selected.

11. Apparatus according to claim 10 wherein the control logic is configured to check whether an identified new alternative route satisfies a set of predefined connection constraints, and to output the identified new alternative route for establishment of the connection only if said constraints are satisfied.

12. Apparatus according to claim 10 wherein the new alternative route identified in step (b) does not utilize any link of said set between said predetermined node and said next closest link.

* * * * *